United States Patent
Odom

(10) Patent No.: US 6,925,907 B1
(45) Date of Patent: Aug. 9, 2005

(54) TRIANGULATED BICYCLE PEDAL SUPPORT STRUCTURE

(76) Inventor: Paul Odom, 9 Orchard La., Hawthorn Woods, IL (US) 60047

( * ) Notice: Subject to any disclaimer, the term of this patent is extended or adjusted under 35 U.S.C. 154(b) by 723 days.

(21) Appl. No.: 09/489,602

(22) Filed: Jan. 20, 2000

(51) Int. Cl.[7] ............................................. G05G 1/14
(52) U.S. Cl. ................................................ 74/594.1
(58) Field of Search .......................... 74/594.1–594.6; 474/144, 151, 160; 280/236

(56) References Cited

U.S. PATENT DOCUMENTS

| | | | |
|---|---|---|---|
| 515,421 A | 2/1894 | Chadbourne | |
| D32,702 S | 5/1900 | Allman | |
| 721,943 A | 3/1903 | Dockstader | |
| 4,271,719 A | 6/1981 | King ......................... | 74/594.2 |
| 4,281,845 A | 8/1981 | Brown ....................... | 280/236 |
| 4,309,043 A | 1/1982 | Brown ....................... | 280/236 |
| 4,811,626 A * | 3/1989 | Bezin ........................ | 74/594.1 |
| 4,816,009 A | 3/1989 | Philipp ....................... | 474/69 |
| 5,070,744 A * | 12/1991 | Wu ............................ | 74/594.1 |
| 5,095,772 A | 3/1992 | Fortson ..................... | 74/594.3 |
| 5,157,988 A | 10/1992 | Pinkstock .................. | 74/594.3 |
| 5,179,873 A | 1/1993 | Girvin ....................... | 74/594.1 |
| 5,336,147 A * | 8/1994 | Sweeney, III .............. | 74/594.1 |
| 5,819,600 A * | 10/1998 | Yamanaka .................. | 74/594.1 |
| 5,904,072 A | 5/1999 | Yamanaka .................. | 74/594.2 |
| 5,911,792 A | 6/1999 | Jaimes ....................... | 74/594.1 |
| 5,924,336 A * | 7/1999 | Richardson ................ | 74/594.1 |
| 5,946,982 A | 9/1999 | Schmidt ..................... | 74/594.2 |

FOREIGN PATENT DOCUMENTS

| | | | | |
|---|---|---|---|---|
| CH | 163752 | * | 8/1933 | ................. 74/594.1 |
| FR | 697361 | * | 1/1931 | ................. 74/594.2 |
| FR | 744531 | * | 4/1933 | ................. 74/594.1 |
| FR | 765602 | * | 6/1934 | ................. 74/594.1 |
| GB | 10556 | * | of 1897 | ................. 74/594.1 |
| IT | 512306 | * | 4/1933 | ................. 74/594.1 |

* cited by examiner

*Primary Examiner*—Chong H. Kim
(74) *Attorney, Agent, or Firm*—Pauley Petersen & Erickson

(57) ABSTRACT

A bicycle with a triangulated crank structure replaces the single span crank arm which connects the spindle to the foot pedal on bicycles today. The triangulated crank structure is typically comprised of several sections including two linear spans of structural material arranged so that one end of each linear span connects with the other to form the vertex of an acute angle, proximate to a pedal attachment area. From the vertex, the linear spans diverge and each connects at its opposite end to separate locations on a structural element attached to an end of the bicycle's crankshaft or spindle.

18 Claims, 6 Drawing Sheets

TRIANGULATED BICYCLE PEDAL SUPPORT STRUCTURE

BACKGROUND OF THE INVENTION

1. Field of the Invention

The invention relates primarily to bicycles, but also to any other human powered vehicles, watercraft, or exercise devices which utilize a foot pedal or handgrip for the operator to convert rotational motion and/or linear motion of his feet or hands, into work, in order to activate the device.

2. Description of Prior Art

Bicycle crank arms in general, provide a means for physically connecting the foot pedals of the bicycle to the crankshaft of the bicycle. In some cases, one of the crank arms is also attached to a chain sprocket, or a set of axially concentric sprockets, which drives a chain for the purpose of transmitting power to the drive wheel of the bicycle. Whether the sprocket is attached directly to the crankshaft or spindle, or indirectly to the spindle through one of the crank arm assemblies, the crank arms enable force exerted on the foot pedals to be transferred into power to propel the bicycle as the foot pedals sweep through each stroke.

Bicycles have evolved from their earliest designs with a pair of bilaterally symmetric and inversely synchronized foot pedals, each connected to the crankshaft or spindle of the vehicle by a generally straight crank arm. As bicycle consumers have come to put more emphasis on light weight and performance, bicycle manufacturers have endeavored to manufacture lighter and better performing bicycles. This quest has led many manufacturers to utilize computer aided design techniques and exotic materials in the creation of their products. Today, the weights of many components on bicycles are usually communicated in gram units, because the emphasis on weight reduction is so great that the units of pounds and ounces are insufficiently explicit for many consumers.

One of the largest concentrations of structural material in a typical bicycle is in the crank arm. That often corresponds to one of the largest concentrations of weight on a bicycle, despite some manufacturers' use of exotic lightweight materials at this location. Reducing weight by using such materials usually leads to a significant cost penalties or other tradeoffs.

SUMMARY OF THE INVENTION

This invention replaces the double ended crank arm design currently used on bicycles, with a triangulated crank structure. Triangulation is accomplished by replacing a straight bar type structure that connects the spindle to the pedal shaft end of a crank arm, with a split structure that has two separate tube segments, spaced away from a line between the spindle end and the corresponding pedal shaft attachment location, that line being the neutral axis of the structure. During the rider's power stroke, one such tube segment would be mostly under tension while the other would be mostly under compression. This largely eliminates high bending stresses associated with the straight crank design. It does so by moving structural material much further away from the neutral axis of the crank than is possible with a straight crank design.

Mechanical triangulation when applied to bicycle cranks permits a maximum structural efficiency defined as the minimum amount of structural material possible to support a given load. The inherent structural efficiency problem in a triangulated design is the requirement for multiple structural segments. Furthermore, the shortest distance between the spindle end and the pedal shaft attachment means, and therefore the shortest total length of structural material required to connect them, is the straight segment of the prior art.

This invention preferably uses hollow tubes to save weight in the multiple segments. The hollow tubes are structurally optimized to resist both torsion loads due to the offset pedal, and the lateral bending loads perpendicular to the applied force that the tubes experience during cyclical power transmission peaks. The hollow tubes also approach an ideal design for resisting crank deflection when the rider's weight is pushing on the pedal while at or near the top or bottom of the stroke. Also, this invention preferably uses only two structural segments or struts to connect the hollow tubes to the spindle and/or sprocket assembly. Lastly, the crank structure on the same side of the vehicle as the drive sprocket uses two structural segments or struts to connect the structure efficiently to four sprocket bolts on a five bolt sprocket, or to two sprocket bolts on a four bolt sprocket.

The primary object of the invention is to improve structural efficiency of bicycle cranks, thereby decreasing weight without any reduction in strength or stiffness. The invention can provide bicycle cranks with both strength enhancement and weight reduction benefits.

BRIEF DESCRIPTIONS OF THE DRAWINGS

DESCRIPTION OF PREFERRED EMBODIMENTS

Figure 1:
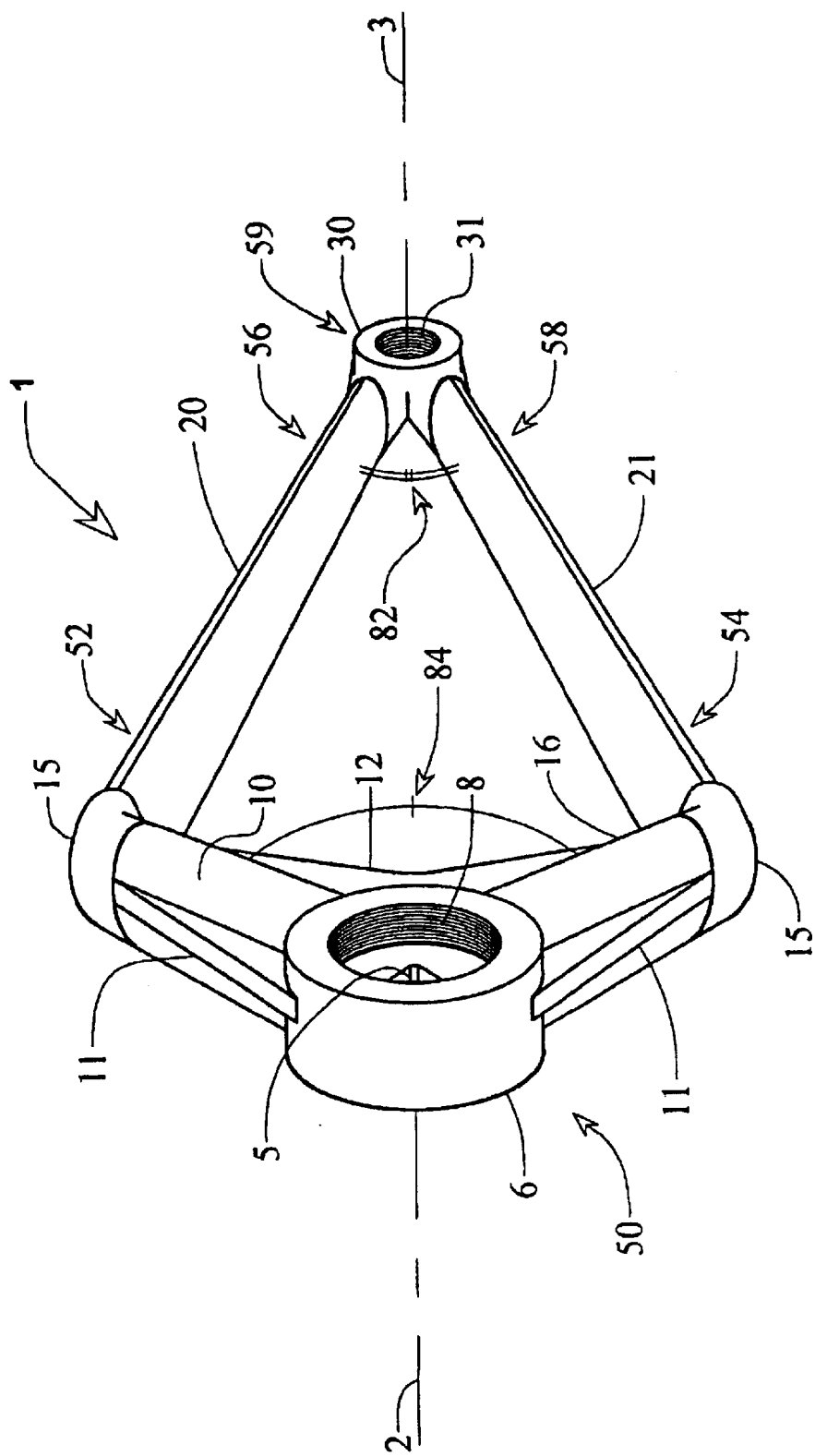
FIG. 1 is a side perspective view of one preferred embodiment of the triangulated bicycle crank structure disclosed in this invention.

FIG. 1 discloses a structure 1 for rotatively connecting the pedal of a bicycle to the spindle of a bicycle. Structure 1 comprises a hub 6 which includes an opening 5 to receive the end of a spindle, which rotates on an axis 2. Hub 6 further includes internal threading 8 recessed from its outer face for the purpose of securing a threaded cap which can cover the outer opening of the hub. According to one preferred embodiment of this invention structure 1 comprises two struts, preferably a first connection strut 10 and a second connection strut 16, attached to hub 6, which extend radially away from the center of hub 6, preferably at an attachment angle 84 of less than 200° and optimally less than 180°. While these struts 10, 16 are generally round and hollow in the preferred embodiment, they may be of any cross sectional profile, including rectangular, round, elliptical, "C" or "D" or "I beam" shaped, etc. First connection strut 10 and second connection strut 16 may or may not taper, and may or may not be partially or completely hollow. Outside exterior reinforcing webs 11 and inside exterior reinforcing web 12 are included in one preferred embodiment of this invention to reduce material stresses where first connection strut 10 and second connection strut 16 attach to hub 6 at spindle shaft end 50. While these reinforcing webs 11 and 12 are shown in FIG. 1 in a plane that approximately bisects the first and second connection struts 10 and 16, the quantity, size, configuration, and location of the reinforcing webs are not necessarily constrained as shown by FIG. 1. It is actually intended for the reinforcing webs 11 and 12 to have different characteristics depending on whether they are on the crank structure associated with the right side or the left side of the bicycle. On the right side of the bicycle, typically the sprocket side, webs 11 and 12 would be positioned relatively flush with the inside face of hub 6 to facilitate sprocket attachment.

FIG. 1 also shows two knuckles 15 for attaching first arm 20 and second arm 21 to the outer end of first and second connection struts 10 and 16. Depending on the cross sectional profile of connection struts 10 and 16, it may be practical to manufacture knuckles 15 as extensions of first and second connection struts 10 and 16, rather than as separate pieces to be attached during assembly. Unless first arm 20 and second arm 21 have a round cross sectional outer profile at their respective ends, they cannot be threaded and screwed into knuckles 15. Since the cross sectional shape of first arm 20 and second arm 21 in the preferred embodiment is elliptical, a preferable means of attaching first arm 20 and second arm 21 to the corresponding knuckle 15 at a first crank end 52 and a second crank end 54, respectively, is a powerful adhesive applied to the outside walls of the ends of first arm 20 and second arm 21 prior to insertion into an appropriately shaped hole in knuckle 15. Knuckles 15 can be similarly attached to struts 10 and 16 in the event that first and second connection struts 10 and 16, and knuckles 15 do not comprise a single piece.

FIG. 1 further discloses a junction 30 at a pedal attachment area 59. Junction 30 is the physical means for connecting first arm 20 and second arm 21 at their first distal end 56 and second distal end 58, respectively. Junction 30 thereby creates a connection angle 82 between first arm 20 and second arm 21. Junction 30 preferably includes internal threads 31 or a similar pedal attachment area 59 for receiving the shaft of a pedal assembly, with said shaft preferably aligned with axis 3. According to one preferred embodiment of this invention, the junction 30 attaches to first arm 20 and second arm 21 in a similar manner as first arm 20 and second arm 21 connect to knuckles 15. Because first arm 20 and second arm 21 are non-parallel when assembled into structure 1, two of them cannot be inserted into knuckles 15 and junction 30 without severely bending at least one of them. Although this assembly problem can be solved by splitting one knuckle 15 or junction 30 into two pieces; using oversize holes with shims; or by putting a backside hole in one of them, such solutions are not shown in FIG. 1. Nor are notches, screws, dowels, or other means for positively and redundantly connecting first arm 20 and second arm 21 to knuckles 15, or to junction 30 shown in FIG. 1. It should be noted that the components of FIG. 1 could be manufactured as a single piece, if a material with flexible fabrication properties such as carbon fiber is used.

Figure 2:
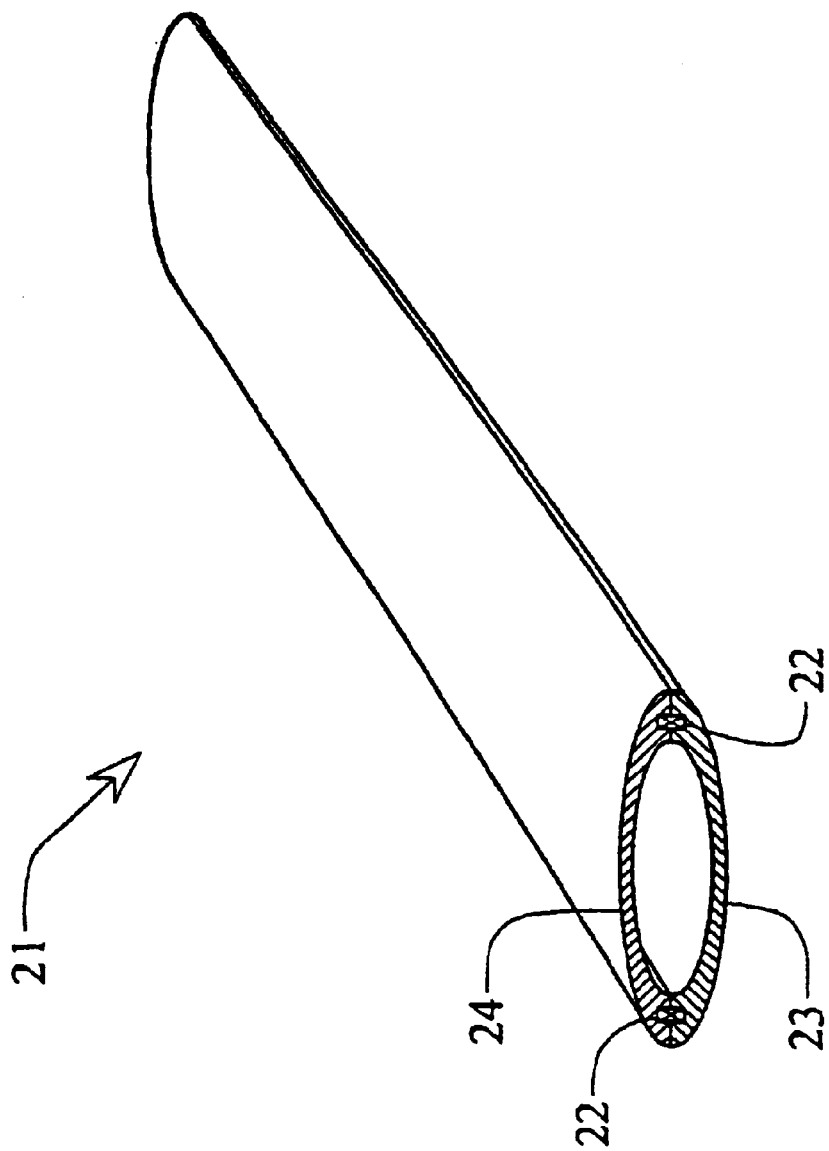
FIG. 2 is a cross sectional perspective view of an elliptical main tube assembly according to one preferred embodiment of this invention.

FIG. 2 shows a perspective end view of second arm 21. The preferred embodiment comprises a hollow or tubular second arm 21, and first arm 20 preferably identical to second arm 21, having generally elliptical cross sections. This cross sectional shape is optimized for resisting a combination of torsional loads and bending loads in the plane of the major axis of the ellipse. The resistance to bending loads in the plane of the major axis of the ellipse is further enhanced by increases in the wall thickness where the major transverse axis of the ellipse comprising the cross section of second arm 21 intersects the second arm 21. The second arm 21 of FIG. 2 does not show any deviation from an elliptical cross section, although replacing the smooth elliptical outer and/or inner profile of one or both narrow sides of the ellipse with a more rectangular design, thus adding structural material, would further improve resistance to bending forces in the plane of the major transverse axis. Any tube cross sectional shape that overlapped the approximate shape of an ellipse will benefit from the structural characteristics of the ellipse in this application. Similarly, first arm 20 and/or second arm 21 could be used in combination with other shapes such as "I" beams to adjust properties in different bending modes. Alternative tube designs, including those with more circular cross sections could be substituted for the elliptical design, which may additionally include an internal and/or external bead or web along a diameter to better resist bending in the plane of that diameter. The preferred embodiment comprises a first arm 20 and a second arm 21 that are straight along their length. Depending on requirements for clearance with other components of the vehicle, first arm 20 and/or second arm 21 could curve, bend or vary in cross sectional profile at various locations along their lengths. Another preferred embodiment replaces first arm 20 and/or second arm 21 with adjacent round tubes, thus allowing threaded connections with knuckles 15 and/or junction 30. Another preferred embodiment replaces the hollow tubes of first arm 20 and/or second arm 21 with "C" sections, and additionally preferably includes a facia covering the opening between first arm 20 and second arm 21.

Because it is difficult to use high strength alloys such as aluminum alloys to manufacture a seamless tube, such as the preferred embodiment of second arm 21, with the aspect ratio and elliptical cross sectional shape and the different wall thickness necessary to structurally optimize its design, a multi-piece assembly is utilized in one preferred embodiment of this invention to manufacture an elliptical tube. Two halves of an elliptical tube including a lower piece 23 and an upper piece 24 are mated together to produce a tube with an elliptical cross section. In order to properly align pieces 23 and 24 relative to one another, and to mate them more securely to each other, one or more rectangular keys 22 may be included on each side of the assembly. The keys 22 fit into corresponding slots on pieces 23 and 24. The preferred method for attaching pieces 23, 24 and keys 22 is with a powerful adhesive, although more traditional attachment means such as welding, screws, collars, etc., are possible. When an adhesive is used, keys 22 afford shear planes, typically perpendicular to the primary mating plane of pieces 23 and 24, that improves the performance of the adhesive. While it is possible to machine one or more keys or shear planes into the mating surface of lower piece 23 and/or upper piece 24, one or more separate keys 22 on each side of first arm 20 and/or second arm 21 are normally simpler from a manufacturing standpoint.

Because of the triangulated orientation of first arm 20 and second arm 21 in the crank structure 1, the design of first arm 20 and/or second arm 21 is optimized for resisting deflection regardless of whether the crank structure 1 is in the vertical or horizontal position while being subjected to a vertical load.

Figure 3:
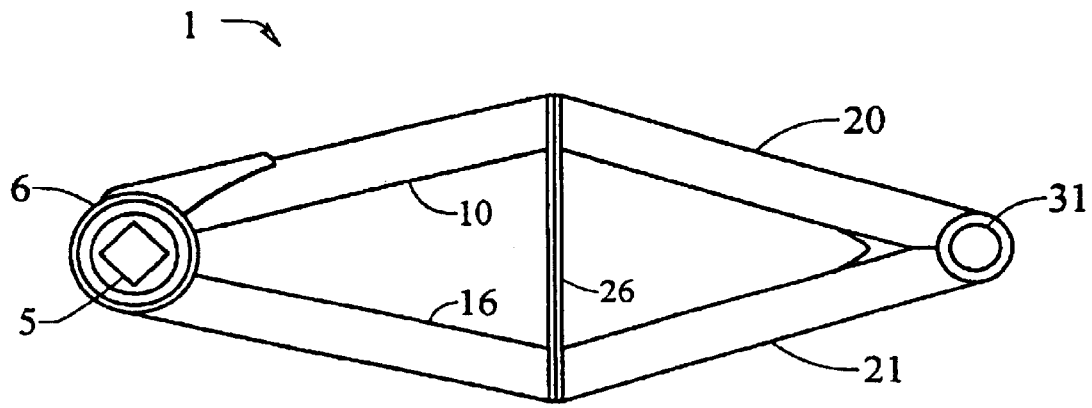
FIG. 3 is a side view of a triangulated bicycle crank structure where the orientation of the two tubes is adjusted to attach to a second pair of tubes that extend further from the spindle attachment location according to another preferred embodiment of this invention.

FIG. 3 shows a side elevational view of a crank structure 1 with a spindle attachment hole 5, and a pedal shaft receiving hole 31, or similar pedal attachment area 59 at its other end. In this figure, first and second connection struts 10 and 16 are longer than a preferred embodiment shown in FIG. 1, and incorporate a smaller attachment angle 84 between them. First and second connection struts 10 and 16 have approximately the same proportions as first arm 20 and second arm 21, which are correspondingly shorter than the design of FIG. 1. A bridge 26 serves both as a means to attach the middle ends of first and second connection struts 10 and 16, and first arm 20 and second arm 21 together, and to complete the triangle otherwise formed by first and second connection struts 10 and 16, and first arm 20 and second arm 21 on either of its sides, thereby maximizing the rigidity of the structure. Additional bridges 26, not shown, can be included at other locations than the junction of first and second connection struts 10 and 16, and first and second arms 20 and 21, in order to further stiffen the structure. Bridge 26 is shown in this figure as a flat plate viewed from the side, although it could be a truss section, thereby effectively shortening first connection strut 10 and/or second connection strut 16, and first arm 20 and/or second arm 21, at the expense of cost and complexity. It is presumed that there would be weight saving techniques, such as the inclusion of holes in bridge 26, utilized during the manufacture of crank structure 1. In this design, first and second connection struts 10 and 16, and first arm 20 and second arm 21 may be identical. This structure offers the same advantage as the design of FIG. 1 in terms of reduced material weight by virtue of the structural material being located away from the neutral axis of the crank structure 1. The neutral axis for the entire crank structure 1 is the axis through the structure which intersects the axis of rotation of the spindle and the axis of rotation of the pedal. Although this design has the same high material stress levels as a traditional single span crank where first connection strut 10 intersects hub 6, it is structurally superior, and therefore potentially lighter and stronger, to a traditional single span crank along most of its length.

Figure 4:
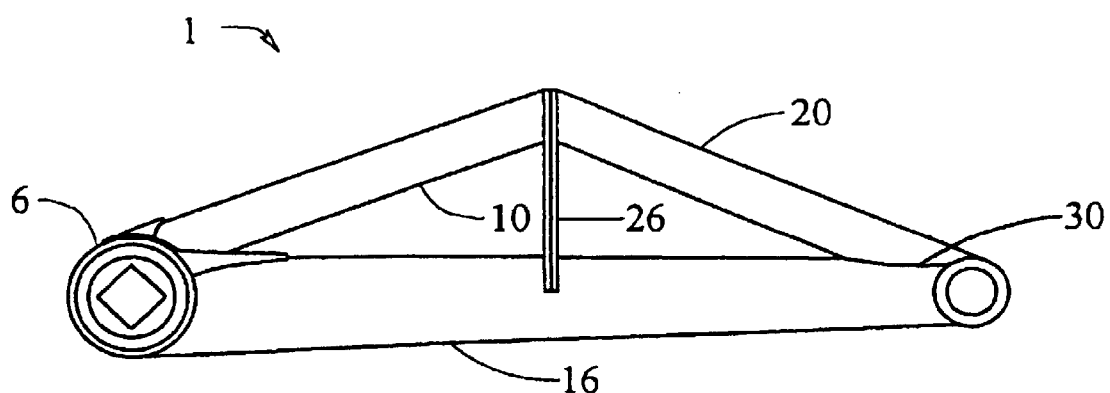
FIG. 4 is a side view of a triangulated crank structure according to another preferred embodiment of this invention wherein two of the adjoining tube segments shown in FIG. 3 are approximately collinear and comprise a single tube.

FIG. 4 shows a side elevational view of a triangulated crank structure 1 wherein second connection strut 16 of the previous designs extends directly from the vicinity of hub 6 to the vicinity of junction 30 thereby eliminating the need for a separate second arm 21. A bridge 26 is included in this design to provide the necessary triangulation and interconnection means to first connection strut 10 and first arm 20. It is possible to modify current single span cranks to become triangulated designs by attaching a first connection strut 10, a first arm 20, and a bridge 26 to current non-triangulated crank designs to increase their stiffness and/or reduce their weight. While the design of FIG. 4 shows the triangulating first connection strut 10, first arm 20, and bridge 26 above the second connection strut 16, there is no reason that the design could not be inverted with respect to a horizontal axis.

Figure 5:
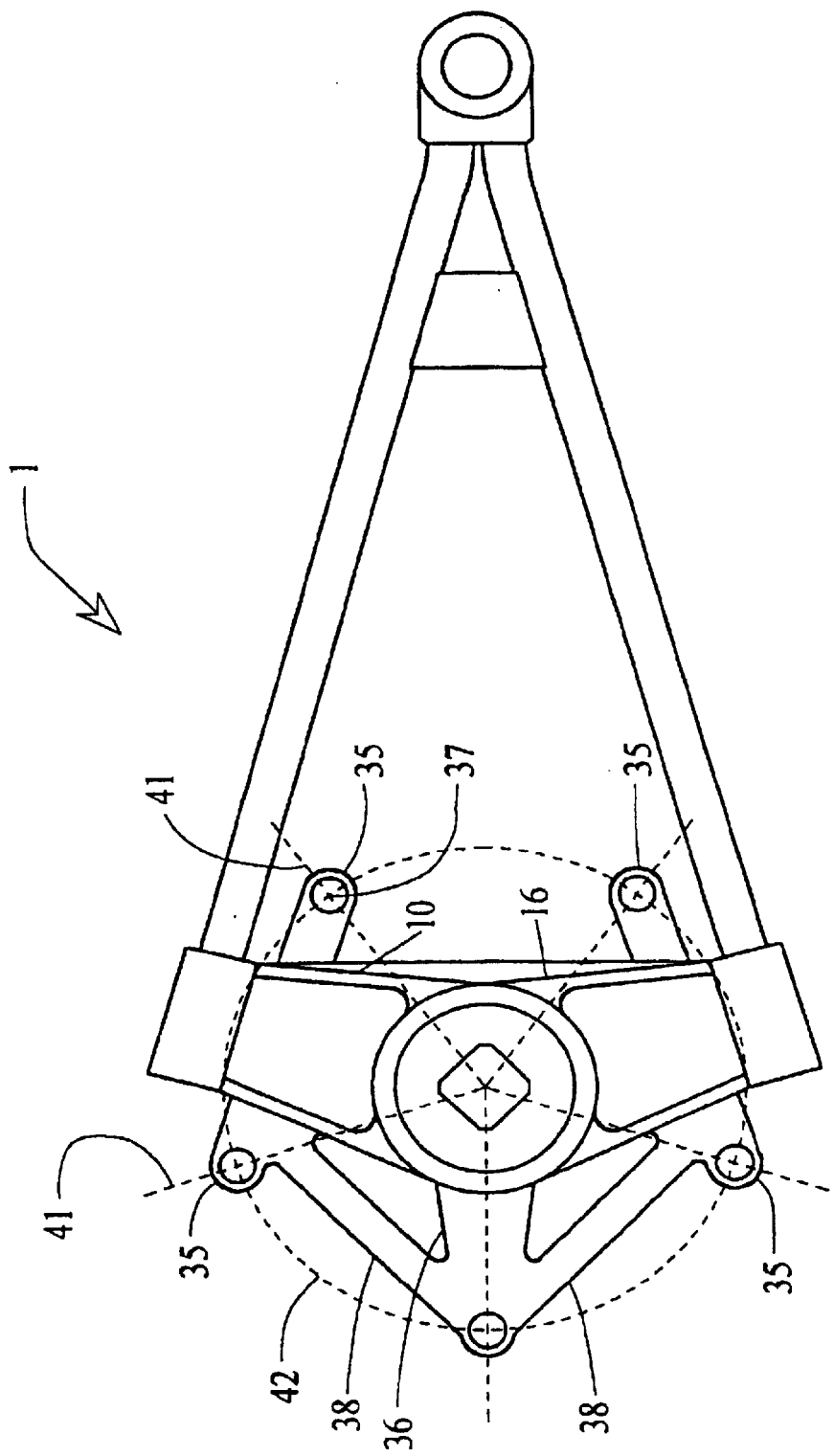
FIG. 5 shows a side view of the triangulated crank structure shown in FIG. 1 which also includes four flanges for attaching a sprocket (assembly) directly to the triangulated crank structure.

FIG. 5 shows a side elevational view of a crank structure 1 which includes a plurality of locations to fasten the structure 1 to a sprocket or sprocket assembly. FIG. 5 further shows a radially symmetric arrangement of five dashed lines 41 intersecting at the center of hub 6, and a circular dashed line 42 concentric with hub 6. The locations of the intersections of lines 41 and a circle 42, of which only one is shown, represent the bolt hole 37 locations of a typical five bolt pattern for attaching a sprocket assembly to the crank structure 1. Flanges 35 allow the sprocket to be attached directly to first and second connection struts 10 and 16, thus avoiding a sprocket attachment means emanating from hub 6, such as flange 36. This eliminates opportunities for creaking or breaking at the junction between the hub 6 and any radially concentric sprocket mounting hole array attached thereto. Furthermore, attaching flanges 35 directly to first and second connection struts 10 and 16 improves structural efficiency over other designs since first and second connection struts 10 and 16 are already in the immediate vicinity of the sprocket attachment points, represented by the location of bolt holes 37, and therefore less material is necessary than would otherwise be required to connect flanges 35 to hub 6. Braces 38 may be included to provide additional reinforcement to flange 36. The arrangement of flanges 35 in FIG. 5 represent just one of numerous possible configurations that take advantage of the proximity of first and second connection struts 10 and 16 to industry standard sprocket mounting holes locations 37. It should be noted that while flanges 35 are attached to first and second connection struts 10 and 16 in the preferred embodiment, they could be attached to other components of the crank structure 1 on other crank structure designs that are modifications of the preferred embodiment, wherein said other components may be in close proximity to standard or non-standard sprocket mounting locations.

Figure 6:
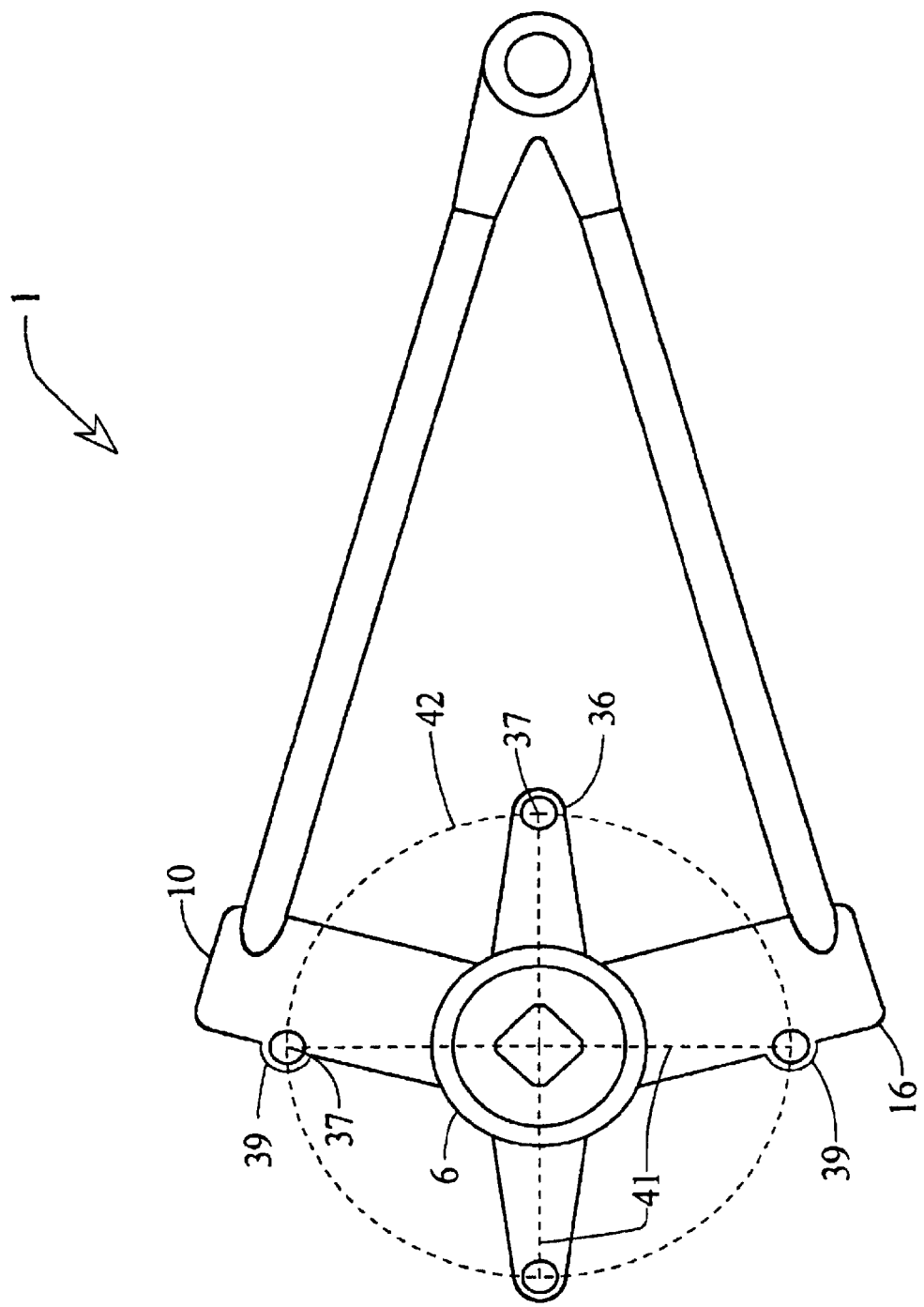
FIG. 6 shows a side view of the triangulated crank structure shown in FIG. 1 which also includes tapped holes for attaching a sprocket (assembly) to the triangulated crank structure.

FIG. 6 also shows a side elevational view of a crank structure 1 which includes a plurality of locations to fasten the structure 1 to a sprocket or sprocket assembly. FIG. 6 further shows a radially symmetric pattern of four dashed lines 41 intersecting at the center of hub 6, and a circular dashed line 42 which is concentric with hub 6. Only one such circular dashed line 42 is shown, although additional ones concentric with hub 6 are representative of bolt pattern diameters typical of multi-speed bicycles today. The locations of the intersections of lines 41 and circle 42 represent the bolt hole 37 locations of a typical four bolt pattern for attaching a sprocket assembly to the crank structure 1. Connection strut holes 39 allow the sprocket to be attached directly to first and second connection struts 10 and 16, thus avoiding a sprocket attachment means emanating from hub 6, such as flange 36. The arrangement of strut holes 39 in FIG. 6 represent just one of numerous possible configurations that take advantage of the proximity of first and second connection struts 10 and 16 to industry standard sprocket mounting holes locations 37.

Figure 7:
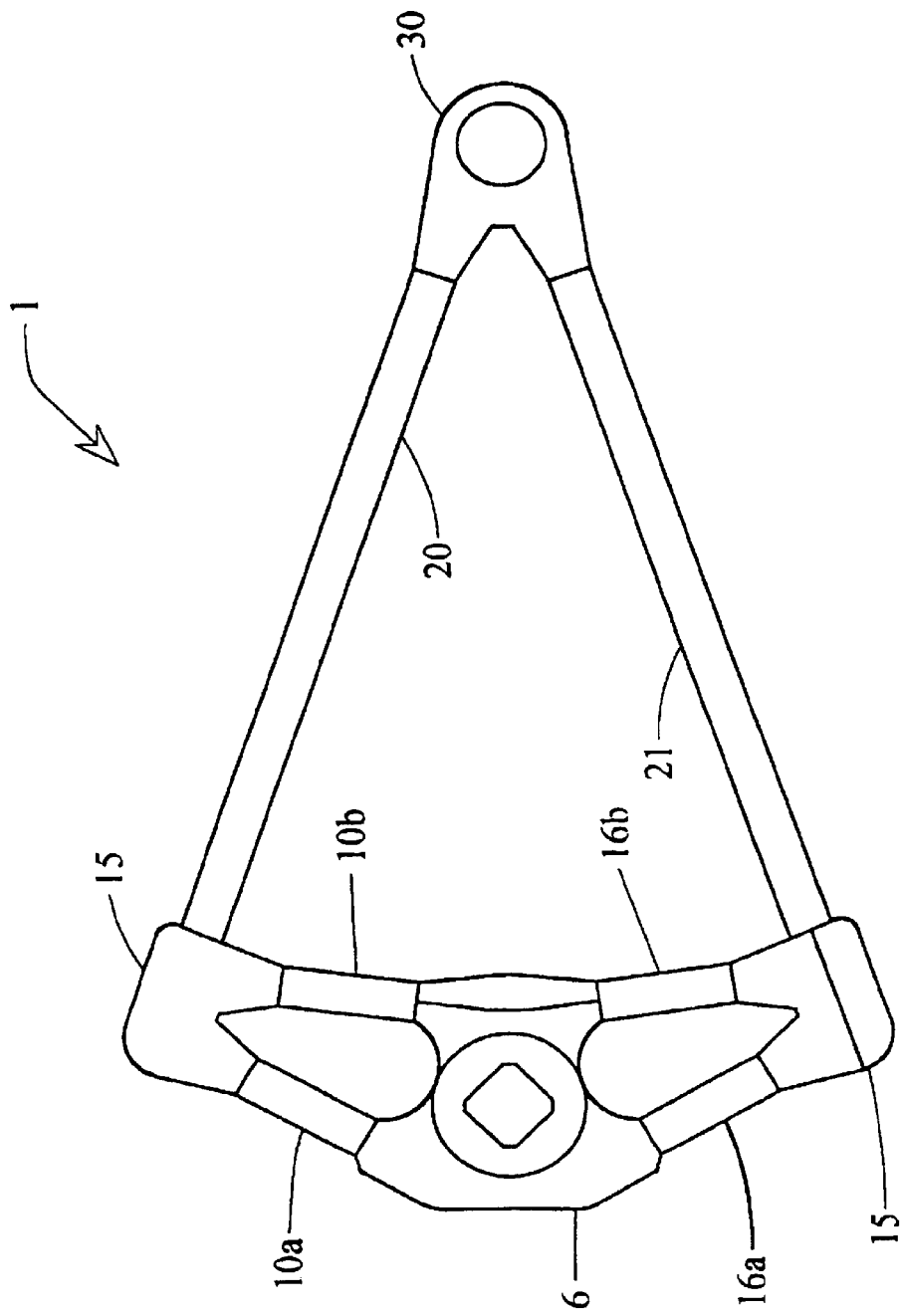
FIG. 7 shows a side view of a triangulated crank structure that incorporates non-parallel adjacent structural segments for connecting the hub area of the crank structure to the attachment location of the main tubes of the structure.

FIG. 7 shows a side elevational view of a crank structure 1 with a hub 6, a first arm 20 and second arm 21, and a junction 30 which are all interconnected. The interconnection means between hub 6 and knuckles 15 of the previous structure is comprised of first and second connection struts 10 and 16 each comprised of a single element. In this figure, single element design of first and second connection struts 10 and 16 is replaced with a multi-element connection strut design consisting of first connection strut segments 10a and 10b, and second connection strut segments 16a and 16b. While it is certainly possible to have more than two such strut segments coming off one side of hub 6, the benefit of additional struts is marginal at best compared to a single strut or double strut design. In this embodiment, first connection strut segments 10a and 10b, and second connection strut segments 16a and 16b, are non-parallel, thus providing a degree of triangulation in the attachment of knuckles 15. Each knuckle 15 of this embodiment has a third hole to accommodate the additional strut segment of the design. In another preferred embodiment, knuckles 15 are integral with first connection strut segments 10a and 10b, and second connection strut segments 16a and 16b. In this preferred embodiment, hub 6 also has holes or solid connection means to rigidly secure one of each of the ends of first and second pairs of connection strut segments 10a and 10b, and 16a and 16b. This design offers the manufacturing advantage of economically fabricating hub 6 and/or knuckles 15 as castings, then utilizing round tubes or tubes comprising a cross section such as that of first arm 20, or alternative non-tubular interconnection means, to interconnect hub 6 and knuckles 15 with minimal weight. When non-tubular connection strut segments 10a and 10b, and 16a and 16b are utilized in the design, the manufacturing option to fabricate hub 6, knuckles 15, and interconnecting strut segments 10a, 10b, 16a, and 16b from a single piece of structural material such as metal becomes more practical. Knuckles 15 or first and second arms 20 and 21, can be fabricated to include flanges with bolt holes or other means for attachment directly to a sprocket or sprocket assembly, since that can be more practical than attaching a sprocket or sprocket assembly directly to first connection strut segments 10a and 10b, second connection strut segments 16a and 16b, or to a rigid fixture attached thereto, depending on the proximity of said components relative to the sprocket attachment points.

While in the foregoing specification this invention has been described in relation to certain preferred embodiments thereof, and many details have been set forth for purpose of illustration, it will be apparent to those skilled in the art that the apparatus according to this invention is susceptible to additional embodiments and that certain of the details described herein can be varied considerably without departing from the basic principles of the invention.

I claim:

1. A bicycle crank structure projecting from a spindle shaft end comprising:
    a first arm having a hollow cross-section, the first arm having a first crank end connected with respect to the spindle shaft end and a first distal end terminating at a pedal attachment area; and
    a second arm having hollow cross-section, the second arm having a second crank end connected with respect to the spindle shaft end and a second distal end terminating at the pedal attachment area, the second distal end connected with respect to the first distal end to form an angle between the second arm and the first arm.

2. The bicycle crank structure of claim 1 further comprising:
    a first connection strut connecting the first arm to the spindle shaft end; and
    a second connection strut connecting the second arm to the spindle shaft end.

3. The bicycle crank structure of claim 2 wherein the first connection strut and the second connection strut are radially asymmetric with respect to the spindle shaft end.

4. The bicycle crank structure of claim 1 wherein at least one of the first arm and the second arm comprise a generally elliptical cross-section.

5. The bicycle crank structure of claim 4 wherein at least one of the first arm and the second arm comprise a multi-piece assembly.

6. The bicycle crank structure of claim 5 wherein the multi-piece assembly is bonded together to form at least one of the first arm and the second arm.

7. The bicycle crank structure of claim 1 wherein the second arm is connected with respect to the spindle shaft end on an opposing side of the spindle shaft end as the first crank end.

8. A bicycle crank structure projecting from a spindle shaft end comprising:
    a first arm having a generally hollow cross-section, the first arm connected at one end with respect to the spindle shaft end and at an opposite end with respect to a pedal attachment area;
    a second arm having a generally hollow cross-section, the second arm connected at one end with respect to the spindle shaft end and at an opposite end with respect to the pedal attachment area; and
    the first arm positioned at a connection angle with respect to the second arm.

9. The bicycle crank structure of claim 8 wherein the first arm comprises a generally elliptical cross-section.

10. The bicycle crank structure of claim 8 wherein the second arm comprises a generally elliptical cross-section.

11. The bicycle crank structure of claim 8 further comprising:
    a first connection strut connecting the first arm to the spindle shaft end; and
    a second connection strut connecting the second arm to the spindle shaft end.

12. The bicycle crank structure of claim 11 wherein the first connection strut and the second connection strut are radially asymmetric with respect to the spindle shaft end.

13. The bicycle crank structure of claim 8 wherein at least one of the first arm and the second arm comprise a multi-piece assembly.

14. The bicycle crank structure of claim 8 wherein the multi-piece assembly is glued together to form at least one of the first arm and the second arm.

15. A bicycle crank structure projecting from a spindle shaft end comprising:
    a first arm having a first crank end connected with respect to the spindle shaft end and a first distal end terminating at a pedal attachment area, the first arm at least partially hollow and having a generally elliptical cross-section; and
    a second arm having a hollow cross-section, the second arm having a second crank end connected with respect to the spindle shaft end and on an opposite side of an axis of rotation as the first crank end, the second arm having a second distal end terminating at the pedal attachment area to form a connection angle with respect to the first arm.

16. The bicycle crank structure of claim 15 wherein the second arm comprises a generally elliptical cross-section.

17. The bicycle crank structure of claim 15 further comprising a multi-piece assembly glued together to form at least one of the first arm and the second arm.

18. A support system for a bicycle crank structure projecting from a spindle shaft end comprising:
    a first strut connected with respect to the spindle shaft end;
    a second strut connected with respect to the spindle shaft end, the second strut positioned at an attachment angle less than approximately 200° from the first strut; and
    a first crank arm having a hollow cross-section connected with respect to the first strut and a second crank arm having a hollow cross-section connected with respect to the second strut, the first crank arm forming a connection angle at a pedal attachment area with respect to the second crank arm.

* * * * *